Jan. 12, 1965 RITSUKO NOSHIRO 3,165,595
MAGNETIC RECORDING AND REPRODUCING DEVICE
Filed May 8, 1962
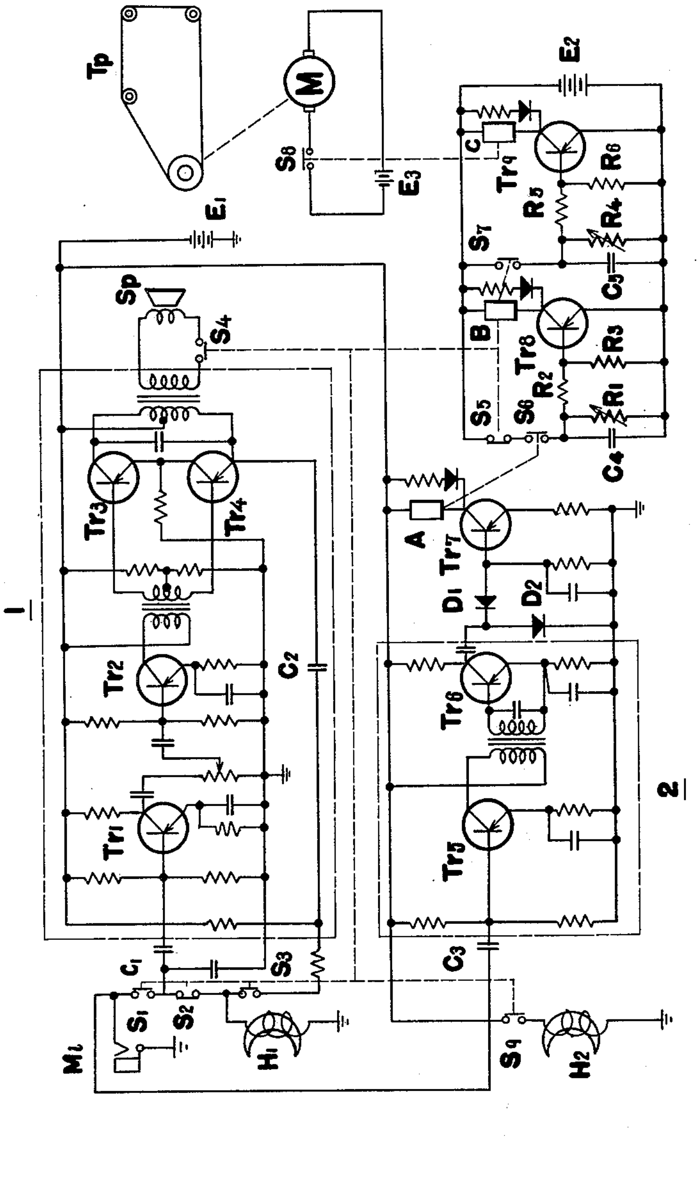

3,165,595

MAGNETIC RECORDING AND REPRODUCING DEVICE

Ritsuko Noshiro, 65 7–chome, Kameido-cho, Koto-ku, Tokyo, Japan

Filed May 8, 1962, Ser. No. 193,120
Claims priority, application Japan, Mar. 14, 1962, 37/10,131
1 Claim. (Cl. 179—100.2)

This invention relates to a magnetic recording and reproducing device and more particularly to a miniature automatic magnetic recording and reproducing device which is provided with an endless magnetic tape and suitable to be mounted inside the body of a doll and the like.

As a result of rapid development and miniaturization of magnetic recording and reproducing devices in recent years it becomes to consider to make attractive toys by utilizing such devices. For example, if such a device is mounted in the body of a doll in such a manner that it will operate to record voices of man in response to such voices and immediately reproduce them it would be able to make very attractive toys giving impressions to customers as if they can understand man's voice and also can speak.

An object of this invention is to provide a novel magnetic recording and reproducing device which can fulfill above mentioned requirement.

Another object of this invention is to provide an automatic magnetic recording and reproducing device which is small in size and consumes small power.

Briefly stated in accordance with this invention there is provided a magnetic recording and reproducing device comprising a microphone, an endless magnetic tape, an electric motor for driving said magnetic tape, a magnetic head which is associated with said magnetic tape and adapted to record and reproduce sound signals received by said microphone, means responsive to said sound signals received by said microphone for switching the operation of said device between recording and reproducing, a time delay device for maintaining said means in operating condition for a predetermined time interval subsequent to ceasing of said sound signals received by said microphones and means for energizing said electric motor for the same time interval as said predetermined time interval. Actually, suitable amplifiers, preferably a transistor type, are connected between said microphone and magnetic head and between said microphone and the switching means, respectively. By this device it is able to automatically record sound signals for a definite interval of time and immediately reproduce them for the same interval.

While the specification concludes with the claim particularly pointing out and distinctly claiming the subject matter which are regarded as this invention, it is believed that the invention will be better understood from the following description taken in connection with the accompanying drawing in which a single drawing illustrates a connection diagram of one embodiment of this invention.

Referring now to the accompanying drawing a microphone $M_1$ is connected to the input terminal of an amplifier 1 through a normally opened contact $S_1$ and a coupling condenser $C_1$. The amplifier 1 comprises cascade connected transistors $Tr_1$ and $Tr_2$ and transistors $Tr_3$ and $Tr_4$ which are connected in push-pull. The common junction between the contact $S_1$ and the condenser $C_1$ is connected to a reproducing and recording magnetic head $H_1$ through a normally closed contact $S_2$. Also the emitter electrode of the transistor $Tr_4$ of said amplifier 1 is connected to said magnetic head $H_1$ via a condenser $C_2$ and a normally opened contact $S_3$. Across the output transformer of said amplifier 1 is connected a suitable speaker $Sp$ via a normally closed contact $S_4$.

The microphone $M_1$ is also connected to the input of a second amplifier 2 through a coupling condenser $C_3$. This amplifier comprises a pair of transistors $Tr_5$ and $Tr_6$, the output of which being connected via a half wave rectifier $D_1$ to a transistor $Tr_7$ adapted to drive a relay A which is included in the collector circuit of the transistor $Tr_7$. One side of said amplifier 2 which is connected to the negative side of a battery $E_1$ is grounded through a normally opened contact $S_9$ and an erasing magnetic head $H_2$. In order to eliminate positive half cycles of the output of the amplifier 2 a half wave rectifier $D_2$ is connected across its output. Both of said amplifiers 1 and 2 are energized from a suitable source of direct current, indicated as a battery $E_1$.

A pair of transistors $Tr_8$ and $Tr_9$ are provided for operating relays B and C which are respectively included in the collector circuits thereof. These transistors are energized from a second source of direct current $E_2$. A normally closed contact $S_5$ of the relay B, a normally closed contact $S_6$ of the relay A and a condenser $C_4$ are connected in series across said source $E_2$, and the junction between said contact $S_6$ and said condenser $C_4$ is connected to the base electrode of the transistor $Tr_8$ through a $\pi$ circuit comprising resistors $R_1$, $R_2$ and $R_3$. Similarly, a normally opened contact $S_7$ of the relay B and a condenser $C_5$ are connected in series across said direct current source $E_2$ and the junction between them is connected to the base electrode of the transistor $Tr_9$ via a similar $\pi$ circuit comprising resistors $R_4$, $R_5$ and $R_6$. As shown by dotted lines, in addition to control contacts $S_5$ and $S_7$, the relay B operates to actuate said contacts $S_1$, $S_2$, $S_3$, $S_4$ and $S_9$. As schematically shown in the drawing, an electric motor M for driving an endless magnetic tape $Tp$ is connected across a direct current source $E_3$ through a normally opened contact $S_8$ of the relay C.

The magnetic recording and reproducing device embodying this invention operates as follows:

Since the contact $S_1$ is normally opened voice signals produced by voices received by the microphone $M_1$ are supplied to the amplifier 2. After being amplified by the amplifier 2 the voice signals are rectified by the half wave rectifier $D_1$ and supplied to the transistor $Tr_7$ to render it conductive. This will cause to operate the relay A to close its normally opened contact $S_6$. Since at this time the contact $S_5$ is closed, the condenser $C_4$ will be charged up to a potential having a polarity as shown in the drawing whereby to drive the transistor $Tr_8$ conductive. Thus, the relay B will operate to close its contact $S_7$ and open its contact $S_5$ whereby the transistor $Tr_9$ is rendered conductive to energize the relay C. Then the contact $S_8$ is closed to start the motor M to drive the endless magnetic tape $Tp$.

While at the same time, contacts $S_1$, $S_3$ and $S_9$ are closed and the contacts $S_2$ and $S_4$ are opened by the operation of the relay B, the microphone $M_1$ will be connected to the input terminal of the amplifier 1 and the recording and reproducing magnetic head $H_1$ to the output terminal thereof through the coupling condenser $C_2$. As a result of this the voice signals are amplified in the amplifier 1 to supply recording signals to the magnetic head $H_1$ to record them upon the endless magnetic tape $Tp$ which is now continuously driven by the direct current motor M. While at this time the series circuit including the contact $S_5$ is opened by the opening thereof, the input voltage to the transistor $Tr_8$ is maintained for an interval of time as determined by the time constant determined by the condenser $C_4$ and resistors $R_1$, $R_2$ and $R_3$ so that the transistor $Tr_8$ will be maintained conductive for a predetermined time interval to maintain the relay B in the operated condition. When the device is designed such that said time constant is equal to the time required for the endless magnetic tape $Tp$ to complete one revolution, voice signals will be recorded during said time interval. Moreover, as the magnetic head $H_2$ is connected to the battery $E_1$ through the now closed contact $S_9$, all the signals which were recorded on the magnetic tape $Tp$ during the previous operation are erased, thus causing no disturbance to the new recording operation. At the end of said recording period the relay B is deenergized to restore its various contacts to their original positions as shown in the drawing. Thus, closure of the contact $S_2$ will connect the magnetic head $H_1$ to the input side of the amplifier 1, and closure of the contact $S_4$ will connect the speaker $Sp$ to the output side of the amplifier, whereby the device is now ready for reproducing to cause the speaker to reproduce voices which have been recorded as above described.

As in the case of the transistor $Tr_8$, subsequent to the opening of the contact $S_7$, conduction of the transistor $Tr_7$, or the operation of the relay C is maintained for a predetermined interval of time which is determined by the value of the condenser $C_5$ and resistors $R_4$, $R_5$ and $R_6$ so that the endless tape $Tp$ will stop automatically after running one complete revolution. During this interval of reproduction voices which are identical to those collected by the microphone $M_1$ are reproduced continuously for the same time interval.

As can be noted from the above description this invention provides automatic magnetic recording and reproducing device which is small in size, light in weight and consumes small power by effecting switching operation between driving of the endless tape, recording and reproducing by means of a relay actuated by the incoming sounds.

While the magnetic recording and reproducing device according to this invention may be used for general purposes they are particularly suitable for incorporating into dolls and toys to improve their commercial value.

While the invention has been explained by describing a particular embodiment thereof, it will be apparent that improvements and modifications may be made without departing from the scope of the invention as defined in the appended claim.

What I claim as new and desire to secure by Letters Patent of the United States is:

A small magnetic recording and reproducing device for reproducing short sound sequences uttered by children, comprising in combination;

a microphone responsive to a child's voice;

a first amplifier to amplify the output from the microphone including a half wave rectifier, a first transistor biased by the half wave rectifier to render it conductive, a first contact normally open, which is closed by said first transistor becoming conductive;

capacitor-resistor time means, responsive to said first contact and providing an output for a prefixed time;

a second transistor responsive to said capacitor-resistor time means and a second contact normally open, responsive to said second transistor, said second contact being closed for said prefixed time in response to said capacitor-resistor time means output;

motor means responsive to said second contact, an endless tape cyclically driven by said motor means, one cycle corresponding to said prefixed time;

a first magnetic head including a lead line for coupling to a power source with a third contact responsive to said second contact, said first magnetic head being disposed to erase any prior sound on said tape;

a second amplifier coupled to said microphone output;

a second magnetic head responsive to said second amplifier acting on said endless tape, recording sound signals thereon when coupled to the output side thereof and, reproducing said sound signals thereof when coupled to the input side thereof;

first and second switch means connected to said second contact the first switch means being normally opened and being closed by said second contact for said prefixed time to couple said second magnetic recording head to said second amplifier output side, said second switch means being normally closed, for coupling said second magnetic recording head to said second amplifier input side and being opened by said second contact, and, speaker means coupled to said second amplifier means and a fourth contact responsive to said second contact and second switch means enabling said speaker after the end of said prefixed time to provide the signal recorded on said tape during said time period after said prefixed time period has ceased.

References Cited by the Examiner

UNITED STATES PATENTS 2,527,145 10/50 Mitchell ------------ 179—100.1

IRVING L. SRAGOW, *Primary Examiner.*